United States Patent

Kimoto et al.

[11] Patent Number: 5,939,843
[45] Date of Patent: Aug. 17, 1999

[54] ADAPTIVE CONVERGENCE ADJUSTMENT FOR MULTI-SCAN MONITOR

[75] Inventors: Masanobu Kimoto; Paolo A. Espinosa, both of San Diego, Calif.

[73] Assignees: Sony Corporation, Tokyo, Japan; Sony Electronics, Inc., Park Ridge, N.J.

[21] Appl. No.: 08/958,102

[22] Filed: Oct. 27, 1997

[51] Int. Cl.$^6$ .............. H01J 29/51; H04N 9/28; G09G 1/28
[52] U.S. Cl. ............ 315/368.12; 348/745; 348/807; 348/189; 345/22; 345/211; 315/368.18; 315/11.5
[58] Field of Search .............. 315/11.5, 368.11, 315/368.12, 368.13, 368.18; 348/745, 746, 747, 807, 813, 189, 190, 191; 345/22, 211, 212, 150

[56] References Cited

U.S. PATENT DOCUMENTS

| | | | |
|---|---|---|---|
| 3,577,031 | 5/1971 | Welsh et al. | 315/368.18 |
| 4,316,211 | 2/1982 | Mackey et al. | 348/180 |
| 4,706,108 | 11/1987 | Kumagai et al. | 348/178 |
| 4,929,933 | 5/1990 | McBeath et al. | 345/22 |
| 5,041,764 | 8/1991 | Midland et al. | 315/368.12 |
| 5,475,447 | 12/1995 | Funado | 348/745 |
| 5,734,446 | 3/1998 | Tokoro et al. | 348/745 |
| 5,742,338 | 4/1998 | Nose | 348/190 |
| 5,835,029 | 11/1998 | Fujiwara et al. | 341/50 |

*Primary Examiner*—Edward P. Westin
*Assistant Examiner*—Shane R. Gardner
*Attorney, Agent, or Firm*—Blakely, Sokoloff, Taylor & Zafman, LLP

[57] ABSTRACT

The present invention relates to a multi-frequency display system and method for providing color convergence. The system comprises a convergence circuit that is configured to receive a first set and a second set of color input signals. The first of color input signals operates at a first frequency, and the second set of color input signals operates at a second frequency. The system also comprises a controller circuit coupled to the convergence circuit, that is configured to generate a first convergence signal corresponding to the first frequency and a second convergence signal corresponding to the second frequency. The convergence circuit generates a first control signal in response to the first set of color input signals and the first convergence signal. The convergence circuit generates a second control signal based on the second set of color input signals and the second convergence signal. A set of electron guns coupled to the convergence circuit are configured to generate beams that are adjusted to provide color convergence at said first frequency and at said second frequency.

20 Claims, 2 Drawing Sheets

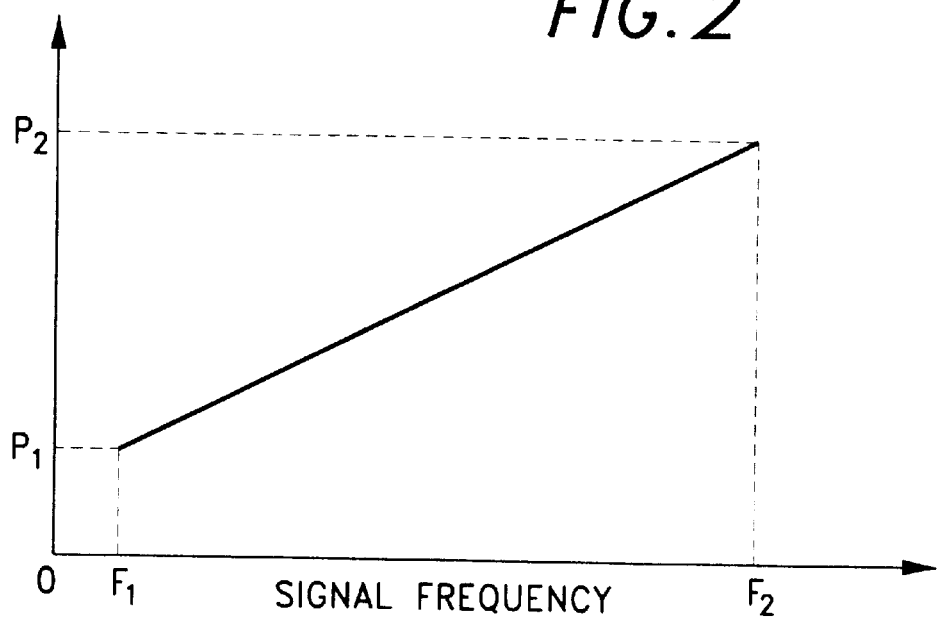
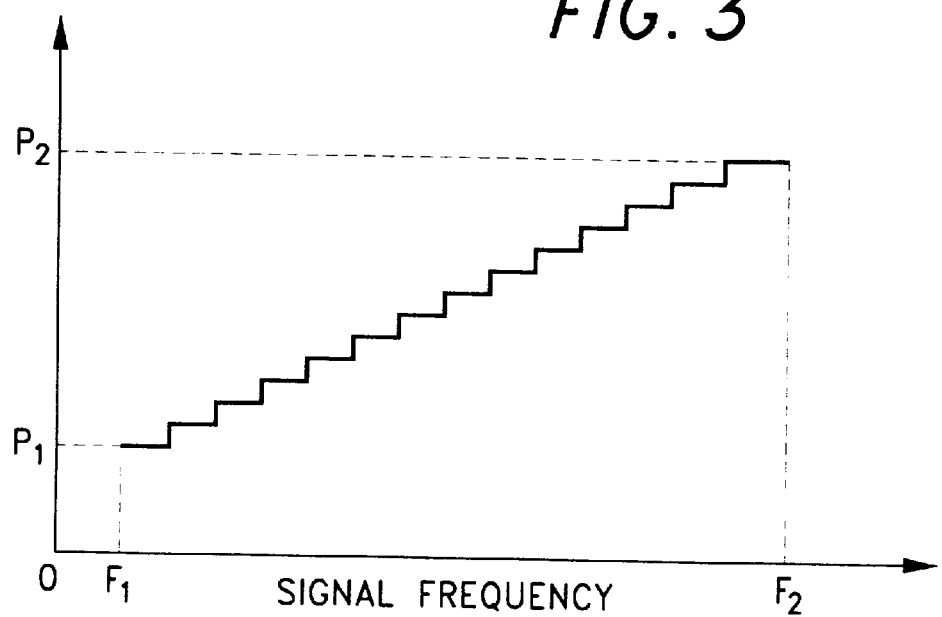

ADAPTIVE CONVERGENCE ADJUSTMENT FOR MULTI-SCAN MONITOR

BACKGROUND OF THE INVENTION

1. Field of the Invention

The present invention relates in general to monitors, and more particularly, to a method and apparatus for providing adaptive convergence adjustment for a multi-frequency scanning monitor.

2. Description of the Related Art

Cathode ray tubes ("CRT") are typically employed in electronic display systems, such as a television receiver or a display apparatus including a CRT numerical display. Each color CRT consists of three electron guns (a red, a green, and a blue electron gun) and a phosphor screen that is located inside an evacuated glass envelope. Each electron gun generates a beam of electrons that is accelerated towards the screen by a positive anode voltage.

Located within the evacuated glass envelope is a color purity magnet that adjusts all three beams at the same time to obtain pure red, green and blue colors. However, refinement is typically needed to aim each beam individually so that the three beams meet at the same point on the screen. Such adjustment for registering all three colors to produce white is called convergence.

The convergence control for individual beam alignment is achieved magnetically, by internal magnetic pole pieces built into the gun assembly. Magnetic flux is coupled into these internal pole pieces, through the glass neck, from an external magnetic assembly called the convergence yoke. The convergence yoke has three magnets, one each for color, namely, red, green, and blue. The adjustment of the permanent magnets is called static convergence, because the magnetic field is steady. Static convergence is adjusted for the center of the picture.

In addition, each coil magnet or electromagnet uses the correction current from the deflection circuits for dynamic convergence. The current can be varied by controls on a separate convergence board. Dynamic convergence is adjusted for the top, bottom, and left and right edges of the picture.

In such conventional convergence control mechanisms, convergence control is typically provided only for signals of a particular frequency, or that of a very narrow frequency range. The placement of the three primary colors is determined according to that particular frequency or that particular narrow range of frequencies. Accordingly, when input signals of a different frequency, or input signals having a frequency that is outside of the very narrow frequency range are encountered, a larger degree of misalignment of the three primary colors occurs. As a result, mismatch of the final color mixture is obtained, for example, a yellowish tint instead of a white color is obtained.

Accordingly, there is a need in the technology for a method and apparatus for providing adaptive convergence adjustment for multi-frequency systems such as a multi-frequency scan monitor.

BRIEF SUMMARY OF THE INVENTION

The present invention relates to a multi-frequency display system and method for providing color convergence. The system comprises a convergence circuit that is configured to receive a first set and a second set of color input signals. The first set of color input signals operates at a first frequency, and the second set of color input signals operates at a second frequency. The system also comprises a controller circuit coupled to the convergence circuit, that is configured to generate a first convergence signal corresponding to the first frequency and a second convergence signal corresponding to the second frequency. The convergence circuit generates a first control signal in response to the first set of color input signals and the first convergence signal. The convergence circuit generates a second control signal based on the second set of color input signals and the second convergence signal. A set of electron guns coupled to the convergence circuit are configured to generate beams that are adjusted to provide color convergence at said first frequency and at said second frequency.

BRIEF DESCRIPTION OF THE DRAWINGS

FIG. 2 illustrates one embodiment of a graph of the convergence adjustment data versus input frequency, used in the multi-frequency convergence adjustment system of the present invention.

FIG. 3 illustrates an alternate embodiment of a graph of the convergence adjustment data versus input frequency, used in the multi-frequency convergence adjustment system of the present invention.

DETAILED DESCRIPTION OF THE INVENTION

Figure 1:
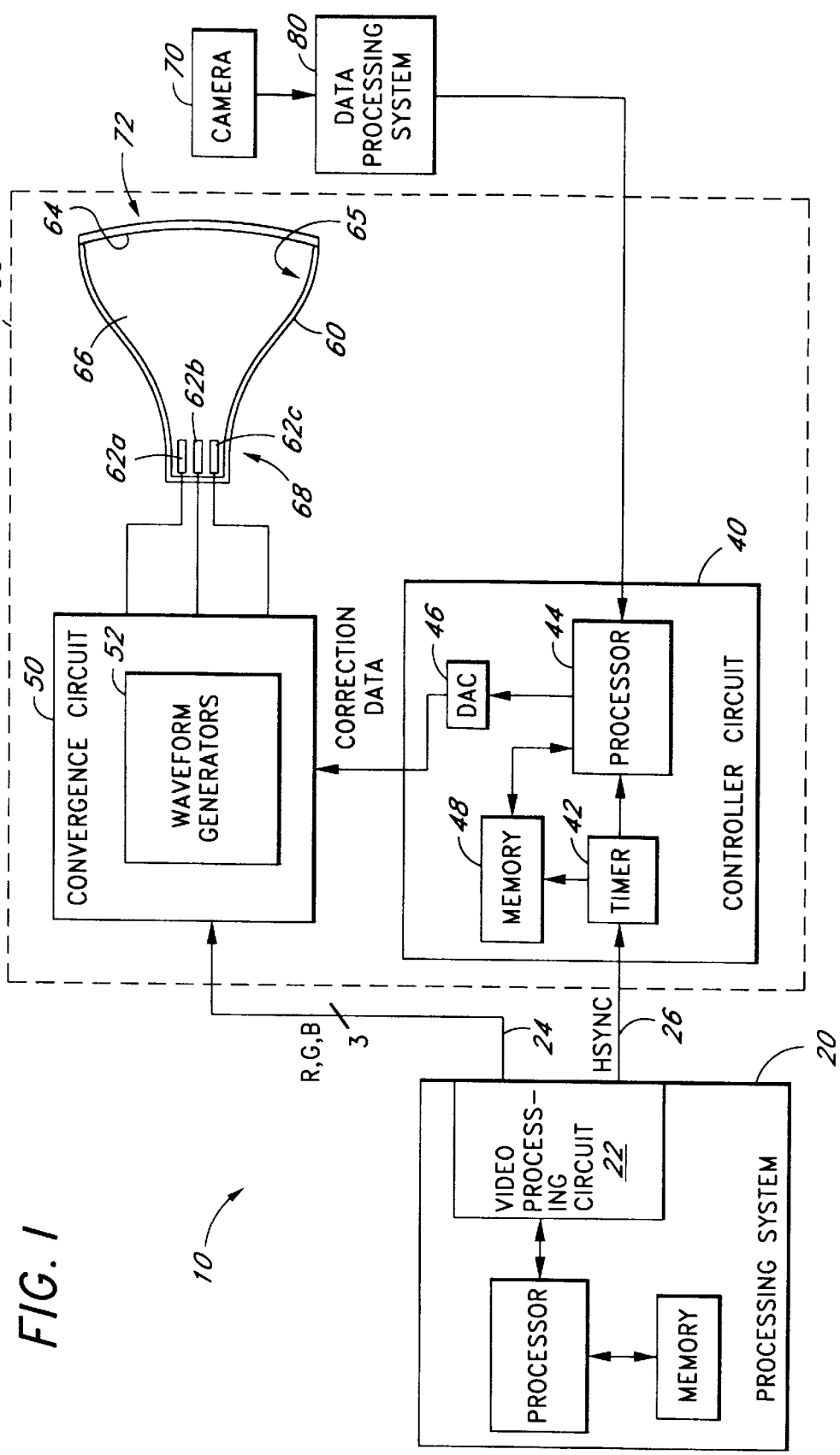
FIG. 1 illustrates one embodiment of the multi-frequency convergence adjustment system 10 provided in accordance with the principles of the present invention.

The present invention is an apparatus and method of determining convergence adjustment information corresponding to a frequency spectrum. The convergence adjustment information is then stored in memory in a display system and later used to provide the appropriate convergence adjustment for a corresponding input frequency.

As shown in FIG. 1, the multi-frequency convergence adjustment system 10 of the present invention comprises a processing system 20 and a display system 30. In one embodiment, the processing system 20 is a computer having a Pentium™ or a Pentium Pro™ processor. The processing system 20 may, however, be any processor-based system. The display system 30 includes a controller circuit 40, a convergence circuit 50 and a cathode ray tube (CRT) 60. The display system 30 is first calibrated by means of a camera 70 and a data processing system 80. This is accomplished by detecting the convergence of the R, G, and B colors for a predetermined frequency range, and storing the corresponding convergence values for the predetermined frequency range.

The processing system 20 includes a video processing circuit 22 such as a video card, that generates a plurality of input signals of a wide frequency spectrum. The input signals are provided to the convergence circuit 50 via signal line 24. The video card 22 also generates clocking signals such as horizontal synchronization signals HSYNC and provides the clocking signals to the controller circuit 40 via signal line 26. The controller circuit 40 includes a timer 42, which receives the clocking signals and provides timing signals for a processor 44, a digital-to-analog converter (DAC) 46, and a memory module 48. The processor 44 also receives convergence data from the CRT 60 during the adjustment process, as described in detail in the following sections. The processor 44 generates correction data based on the convergence data received from the CRT 60, and provides the correction data to the convergence circuit 50. The convergence circuit 50 includes three wave form generators 52, each of which generates signals for a corresponding cathode located in the CRT 60, based on the input signals generated by the video card 22 and the correction data generated by the controller circuit 40. The resulting convergence adjustment information is provided to a respective electron gun or cathode 62a, 62b, and 62c in the CRT 60.

The CRT 60 consists of three electron guns 62a, 62b, 62c and a phosphor screen 64 that is located inside an evacuated glass envelope 66. The narrow neck 68 of the CRT 60 contains the electron guns 62a, 62b, 62c, each of which generates a beam of electrons. Each beam is accelerated towards the screen 64 by a respective positive anode voltage. The anode 65 is a conductive coating on the inside surface of the wide glass bell portion of the CRT 60. To form the screen, the inside of the faceplate 72 is coated with a luminescent material that produces light when excited by electrons in the respective beam. In color picture tubes, the screen 64 is formed with dot trios or vertical lines of red, green, and blue phosphors.

To obtain the required convergence adjustment data, the user has to specify at least two input signals each having a different frequency, and obtain the corresponding correction data for each input signal. In one embodiment, the two input signals are on either extremes of a predetermined or expected input signal frequency range. For example, the input signal frequency may range from 30 KHz to 60 KHz. The user may obtain the corresponding correction data by observing the point of convergence of the three primary colors red, green, and blue (R, G, B) and noting the corresponding correction data at the point of convergence. Alternatively, the camera 70 may be configured to detect the point of convergence of the R, G and B colors for a particular input signal frequency, and provide this information to the data processing system 80, which calculates the value of the corresponding correction data. The processor 44 in the processing circuit 40 is programmed to note the correction data at the point of convergence, as detected by the camera 70. This process is repeated to obtain measurements for a second input signal having a second frequency. In one embodiment, the data processing system 80 has a processor such as a Pentium™ or a Pentium Pro™ processor. However, it is apparent to one of ordinary skill that the processing system 80 may be any processor-based system.

Once the correction data for the two input signals are obtained, they are stored in memory 48, along with the values of the corresponding frequencies of the input signals. The processor 44 then interpolates the information obtained to generate a range of correction data corresponding to different input frequencies (interpolated between the input frequencies of the two input signals). One embodiment of the graph resulting from such interpolation is shown in FIG. 2. The convergence data is typically measured in terms of bit values stored in a register, such as a 6-bit register (which stores values ranging from 0 to 63). In this embodiment, the value of the convergence data corresponding to an input frequency F1 of 30 KHz is 2. The value of the convergence data corresponding to an input frequency F2 of 60 KHz is 63. It is contemplated that more than two data points (i.e., two separate correction data points corresponding to two different frequencies) may be measured, so as to provide a range of correction data with greater accuracy.

In an alternate embodiment, the processor 44 may first provide a first set of correction data based on the interpolation as described above, and then generate correction data that is provided in predetermined or adjustable step-wise increments, as shown in FIG. 3. In either case, the interpolated correction data, and the corresponding input frequencies, are stored in memory 48 for implementation during operation of the display system 30.

Once the test data is obtained and stored, the camera 70 and the data processing system 80 may be disconnected from the display system 30, and the controller circuit 40 may issue correction data to correct the output of the convergence circuit 50 in accordance with the multi-frequency input signals generated by the video circuit 22 of the processing system 20. In one embodiment, the convergence circuit 50 is that marketed by NEC Corporation under the part designation CXA8070A. In another embodiment, the convergence circuit 50 is the $\mu$PC as marketed by NEC Corp. under the part designation 1887CX. The convergence circuit 50 includes three waveform generators (collectively referred to as 52), each of which corresponds to one of the electron guns 62a, 62b, and 62c. Based on the correction data provided by the controller circuit 40 and the input signals provided from the video card 22, the waveform generators 52 generate corresponding control signals to the electron guns 62a, 62b, and 62c, so that appropriate convergence of the beams emanating from each electron gun 62a, 62b, and 62c for the corresponding input frequency, may be provided. When input signals of a second and different input frequency are received, the processor 44 retrieves the appropriate correction data and forwards the data to the convergence circuit 50. The convergence circuit 50 then generates the appropriate control signals to the electron guns 62a, 62b, and 62c, so that proper convergence of the beams emanating from the electron guns 62a, 62b, and 62c at the second input frequency, may be provided.

The present invention thus provides a method and apparatus for providing adaptive convergence adjustment for multi-frequency systems such as a multi-frequency scan monitor.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A multi-frequency display system for providing color convergence, comprising:

a convergence circuit that is configured to receive a first set and a second set of color input signals, said first set of color input signals operating at a first frequency, said second set of color input signals operating at a second frequency;

a controller circuit coupled to the convergence circuit, that is configured to generate a first convergence signal corresponding to the first frequency and a second convergence signal corresponding to the second frequency, said convergence circuit generating a first set of control signals in response to said first set of color input signals and said first convergence signal, said convergence circuit generating a second set of control signals based on said second set of color input signals and said second convergence signal; and a set of electron guns coupled to the convergence circuit, said set of electron guns being configured to generate beams that are adjusted to provide color convergence at said first frequency and at said second frequency.

2. The system of claim 1, further comprising a processing system coupled to said convergence circuit, said processing system having a processor that is configured to provide said first set and said second set of color input signals.

3. The system of claim 2, wherein said processing system is further coupled to said controller circuit, said processing system providing timing signals to said controller circuit.

4. The system of claim 1, wherein said controller circuit comprises a processor and a memory coupled to said processor, said processor storing a first set of values and a second set of values corresponding to said first and said second convergence signals respectively.

5. The system of claim 1, further comprising a processing system coupled to said convergence circuit, said processing system further comprising a processor and a video circuit coupled to said processor, said video circuit being configured to provide said first set and said second set of color input signals under the control of said processor.

6. The system of claim 1, wherein the convergence circuit comprises a set of waveform generators coupled to receive said first set of color input signals and said first convergence signal to provide said first set of control signals, said set of waveform generators also coupled to receive said second set of color input signals and said second convergence signal to provide said second set of control signals.

7. The system of claim 1, wherein the set of electron guns comprises a red, a blue, and a green electron gun.

8. The system of claim 1, wherein each of the first and the second set of color input signals comprises a red input signal, a green input signal, and a blue input signal.

9. The system of claim 1, further comprising a camera and a data processing system coupled between said camera and said controller circuit, said camera for detecting color convergence of the outputs of said set of electron guns at the first and the second frequencies, said data processing system being configured to calculate a first set of values and a second set of values at which color convergence occurs, said data processing system providing said first set of values and said second set of values to said controller circuit.

10. The system of claim 9, wherein said controller circuit comprises a processor and a memory coupled to said processor, said processor storing said first set of values and said second set of values corresponding to said first and said second convergence signals respectively.

11. A method for providing color convergence in a multi-frequency display system, comprising the steps of:

receiving a first set of color input signals corresponding to a first frequency, generating a first convergence signal corresponding to the first frequency; generating a first set of control signals in response to said first set of color input signals and said first convergence signal;

configuring a set of electron guns to generate beams that are adjusted to provide color convergence at said first frequency, based on said first set of control signals;

receiving a second set of color input signals corresponding to a second frequency, generating a second convergence signal corresponding to the second frequency;

generating a second set of control signals in response to said second set of color input signals and said second convergence signal;

configuring the set of electron guns to generate beams that are adjusted to provide color convergence at said second frequency, based on said second set of control signals.

12. The method of claim 11, further comprising the step of configuring a processing system to provide said first set and said second set of color input signals.

13. The method of claim 12, further comprising the step of configuring said processing system to provide timing signals to said display system.

14. The method of claim 12, further comprising the step of providing a video circuit located in said processing system, said video circuit being configured to provide said first set and said second set of color input signals.

15. The method of claim 11, further comprising the step of storing a first set of values and a second set of values corresponding to said first and said second convergence signals respectively.

16. The method of claim 11, wherein the step of generating the first set of control signals comprises the step of providing a set of waveform generators coupled to receive said first set of color input signals and said first convergence signal to provide said first set of control signals, and wherein the step of generating the second set of control signals comprises the step of configuring said set of waveform generators to receive said second set of color input signals and said second convergence signal to provide said second set of control signals.

17. The method of claim 11, wherein in the steps of configuring the set of electron guns, the set of electron guns comprises a red, a blue, and a green electron gun.

18. The method of claim 11, wherein in the steps of receiving the first and the second set of color input signals, each of the first and the second set of color input signals comprises a red input signal, a green input signal, and a blue input signal.

19. The method of claim 11, further comprising the steps of:

detecting color convergence of the outputs of said set of electron guns at the first and the second frequencies;

calculating a first set of values and a second set of values at which color convergence occurs.

20. The method of claim 19, further comprising the steps of storing said first set of values and said second set of values corresponding to said first and said second convergence signals respectively.

* * * * *

UNITED STATES PATENT AND TRADEMARK OFFICE
CERTIFICATE OF CORRECTION

PATENT NO. : 5,939,843
DATED : August 17, 1999
INVENTOR(S) : Kimoto et al.

It is certified that error appears in the above-identified patent and that said Letters Patent is hereby corrected as shown below:

In the Abstract at line 5 insert --set-- after the first occurrence of "first"

Signed and Sealed this

Third Day of April, 2001

Attest:

NICHOLAS P. GODICI

*Attesting Officer*   *Acting Director of the United States Patent and Trademark Office*